(12) United States Patent
Johnson et al.

(10) Patent No.: US 9,027,944 B2
(45) Date of Patent: May 12, 2015

(54) FOLDING SCOOTER

(75) Inventors: Mark Johnson, Cary, IL (US); Emily Rivard, Chicago, IL (US)

(73) Assignee: Radio Flyer Inc., Chicago, IL (US)

( * ) Notice: Subject to any disclaimer, the term of this patent is extended or adjusted under 35 U.S.C. 154(b) by 255 days.

(21) Appl. No.: 13/167,842

(22) Filed: Jun. 24, 2011

(65) Prior Publication Data

US 2011/0316247 A1  Dec. 29, 2011

Related U.S. Application Data

(60) Provisional application No. 61/358,170, filed on Jun. 24, 2010.

(51) Int. Cl.
*B62M 1/00* (2010.01)
*B62K 3/00* (2006.01)
*B62K 15/00* (2006.01)

(52) U.S. Cl.
CPC ............... *B62K 3/002* (2013.01); *B62K 15/006* (2013.01)

(58) Field of Classification Search
USPC ..................... 280/87.042, 87.041, 87.05, 278
See application file for complete search history.

(56) References Cited

U.S. PATENT DOCUMENTS

| | | | |
|---|---|---|---|
| 6,173,976 B1 | 1/2001 | Lee | |
| 6,206,387 B1 | 3/2001 | Tsai | |
| 6,234,501 B1* | 5/2001 | Chen | 280/87.041 |
| 6,244,605 B1* | 6/2001 | Liu | 280/87.041 |
| 6,260,866 B1 | 7/2001 | Cheng | |
| 6,270,095 B1 | 8/2001 | Chang | |
| 6,286,845 B1* | 9/2001 | Lin | 280/87.05 |
| 6,332,621 B1* | 12/2001 | Wu | 280/87.041 |
| 6,367,829 B1 | 4/2002 | Lee | |
| 6,378,880 B1* | 4/2002 | Lin | 280/87.05 |
| 6,390,483 B1 | 5/2002 | Hsu et al. | |
| 6,793,224 B2* | 9/2004 | Stratton | 280/87.042 |
| 7,156,405 B1 | 1/2007 | Ming | |
| 7,513,855 B1 | 4/2009 | Yeh | |
| 7,967,095 B2* | 6/2011 | Kosco et al. | 280/278 |
| 7,976,035 B2* | 7/2011 | Chan | 280/87.05 |
| 2001/0017450 A1 | 8/2001 | Chuang | |
| 2001/0030405 A1 | 10/2001 | Wu et al. | |
| 2002/0050696 A1 | 5/2002 | Lan | |
| 2002/0089139 A1 | 7/2002 | Reynolds et al. | |
| 2009/0160150 A1 | 6/2009 | Johnson | |
| 2009/0230648 A1 | 9/2009 | Chan | |

FOREIGN PATENT DOCUMENTS

| | | |
|---|---|---|
| CN | 2428170 Y | 5/2001 |
| CN | 201132569 Y | 10/2008 |
| GB | 2360984 A | 10/2001 |

* cited by examiner

Primary Examiner — Hau Phan
(74) Attorney, Agent, or Firm — McDermott Will & Emery LLP

(57) ABSTRACT

A folding scooter has an unfolded position, suitable for riding the scooter, and a folded position, suitable for storing the scooter. The folding scooter includes a folding mechanism that has a spring-loaded pin.

14 Claims, 6 Drawing Sheets

FOLDING SCOOTER

CLAIM OF PRIORITY

This application claims priority to U.S. Provisional Patent Application No. 61/358,170, filed Jun. 24, 2010, currently pending.

BACKGROUND

The present technology relates to scooters that are typically used by children for entertainment, where a child stands on the scooter with one foot and uses the other foot to propel the scooter along a riding surface. More specifically, the present technology relates to a folding scooter, which can be rotated from an unfolded position to a folded position.

Scooters are a popular type of riding toy among children of various ages. Scooters typically have a base with at least a front wheel and a rear wheel. Scooters also typically have a handlebar shaft that extends upwards, generally perpendicular to the base, and has handlebars for a child to grip while riding the scooter.

Although scooters are generally more compact than other riding toys, such as tricycles and bicycles, the shape of scooters can result in difficulties for storing scooters or transporting them in a vehicle such as a car.

BRIEF SUMMARY

Folding scooters disclosed herein can be rotated from an unfolded position to a folded position. The folding mechanism of the folding scooters described herein can include a spring-loaded pin.

In one aspect, a folding scooter is provided that includes a deck; a front frame member having a leading end and a trailing end, the front frame member being pivotally connected to the deck by a folding mechanism having a spring-loaded pin; a head tube connected to a front end of the front frame member; a handlebar shaft connected to the head tube; a front wheel connected to the head tube; and a back wheel connected to the deck.

BRIEF DESCRIPTION OF SEVERAL VIEWS OF THE DRAWINGS

Specific examples have been chosen for purposes of illustration and description, and are shown in the accompanying drawings, forming a part of the specification.

DETAILED DESCRIPTION

Figure 1:
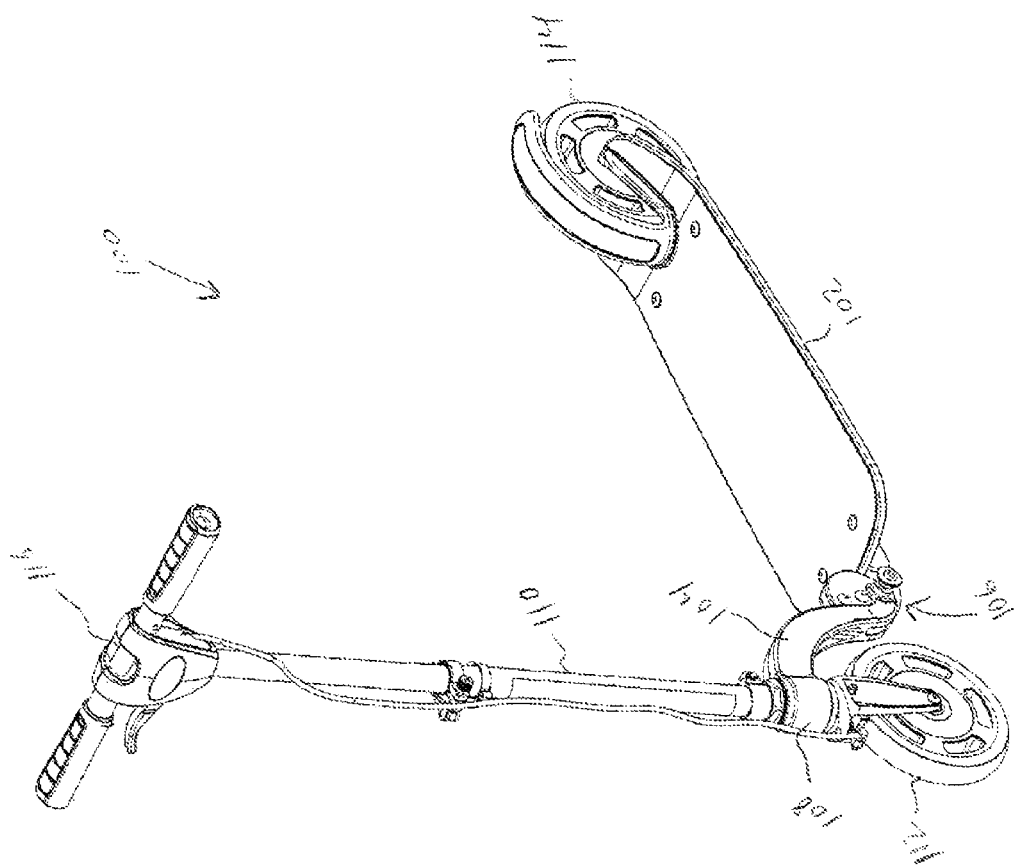
FIG. 1 illustrates one example of a folding scooter in an unfolded position.
Figure 2:
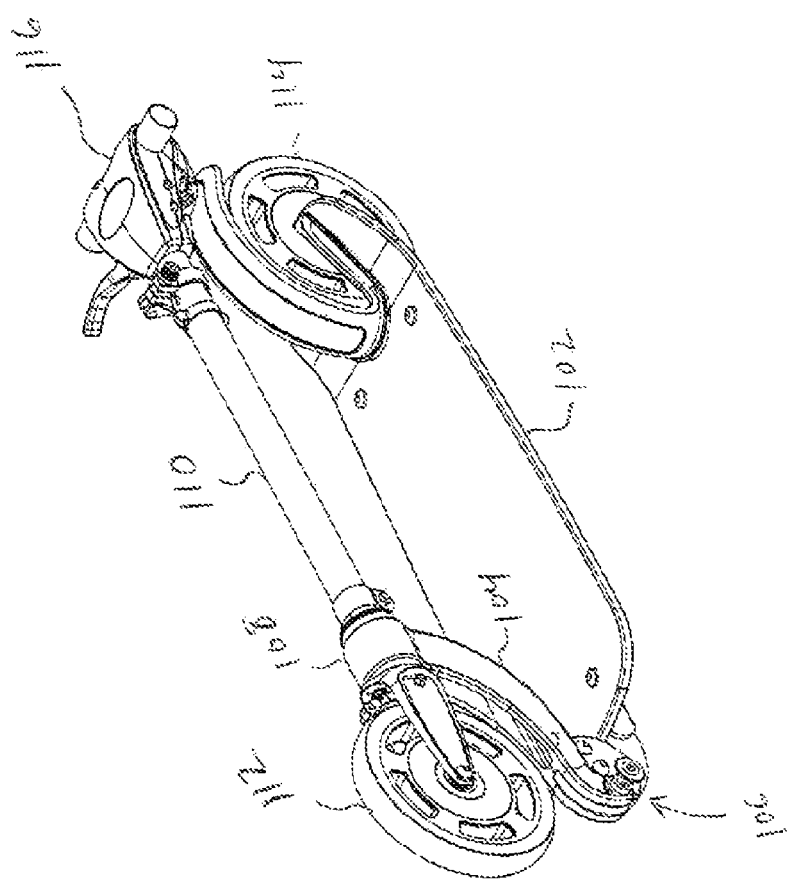
FIG. 2 illustrates the folding scooter of FIG. 1 in a folded position.

One example of a folding scooter 100 is illustrated in FIGS. 1 and 2. The folding scooter 100 includes a deck 102, a front frame member 104 pivotally connected to the deck 102 by a folding mechanism 106, a head tube 108 connected to a front end of the front frame member 104, a handlebar shaft 110 connected to the head tube 108, a front wheel 112 connected to the head tube 108, and a back wheel 114 connected to the deck 102. The handlebar shaft 110 can include handlebars 116. In at least one example, the handlebar shaft 110 is rotationally connected to the head tube 108, and the front wheel 112 can rotate when the handlebars 110 are rotated in order to steer the scooter.

FIG. 1 shows the folding scooter 100 in an unfolded position. When the scooter is in the unfolded position, it is ready for use. In the unfolded position, the handlebar shaft 110 extends upwards, and is perpendicular, or substantially perpendicular, to the deck 102 and/or to the ground.

FIG. 2 shows the folding scooter 100 in a folded position. When the folding scooter is in the folded position, is can be more compact and easier to store or transport than when the scooter 100 is in the unfolded position. In the folded position, the front frame member 104, and the components on the front, of the folding scooter attached thereto, are pivoted about the folding mechanism 106 so that the handlebar shaft 110 is rotated downwards towards the deck 102, and rests substantially parallel to the deck 102 and/or the ground, or at a small angle to the deck 102 and/or the ground.

Figure 3:
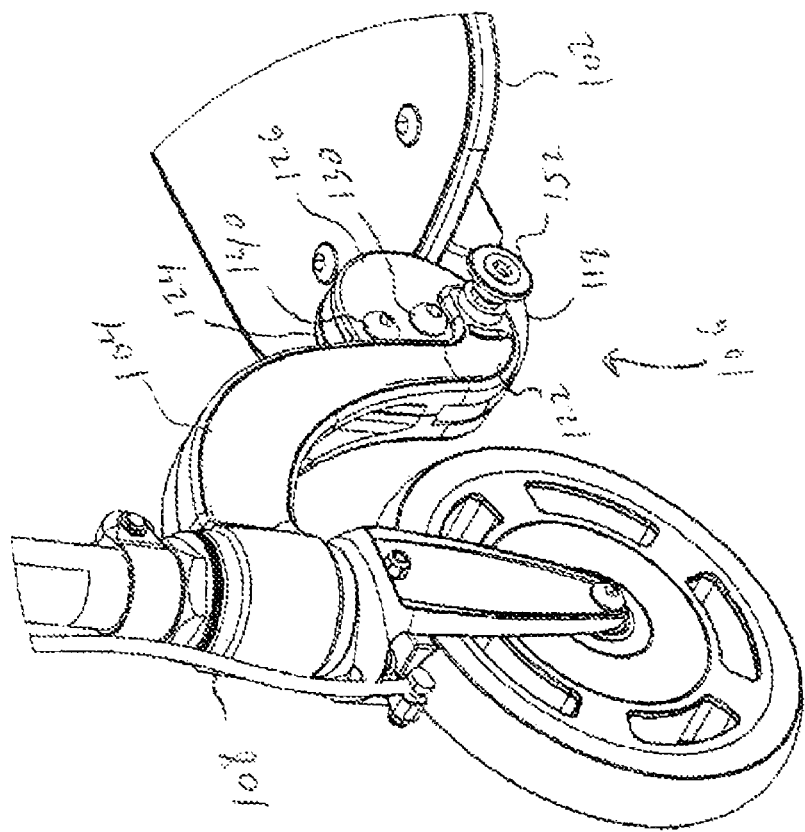
FIG. 3 illustrates the folding mechanism of the folding scooter of FIG. 1 in an unfolded position.
Figure 4:
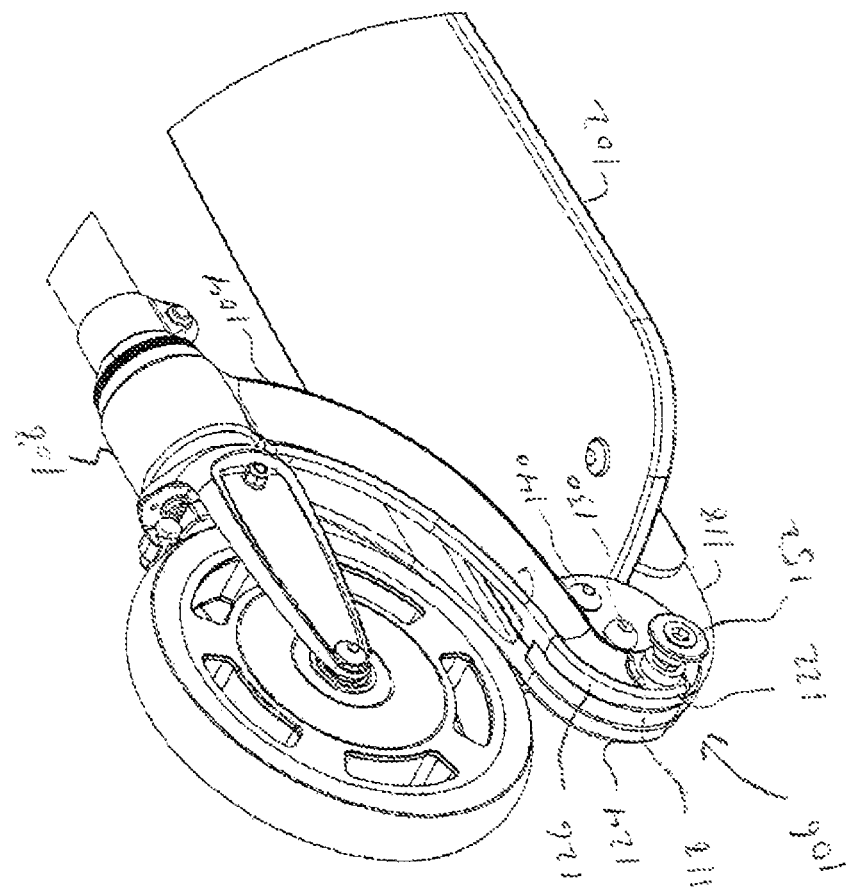
FIG. 4 illustrates the folding mechanism of the folding scooter of FIG. 1 in a folded position.
Figure 5:
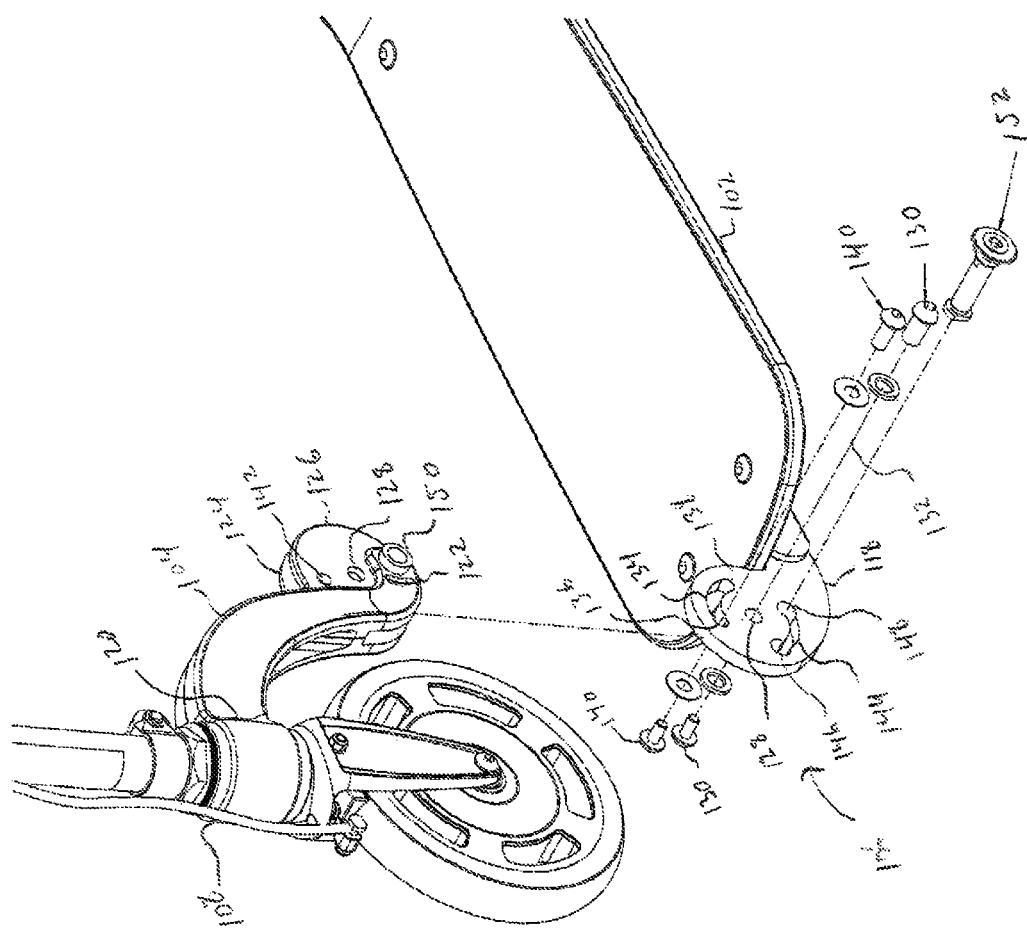
FIG. 5 illustrates an exploded view of the folding mechanism of the folding scooter of FIG. 1.

FIGS. 3 through 5 illustrate one example of a folding mechanism 106. A middle plate 118 is connected to and extends from a front end of the deck 102. The front frame member 104 has a leading end 120 and a trailing end 122. The leading end 120 of front frame member 104 is connected to the head tube 108. The trailing end 122 of the front frame member 104 is bifurcated, and includes a first outer plate 124 and a second outer plate 126. The outer plates 124 and 126 are preferably generally circular in shape and substantially parallel to each other. The outer plates 124 and 126 are configured to receive the middle plate 118 that is connected to the deck 102. The middle plate 118 can slide between the outer plates 124 and 126. The outer plates 124 and 126, and the middle plate 118 can then be connected to form the folding mechanism 106. For example, the middle plate 118, the first outer plate 124 and the second outer plate 126 can each include a central axis opening 128 that align when the middle plate 118 is received between the outer plates 124 and 126. A central bolt 130 can pass through the aligned central axis opening to connect the middle plate 118 and the outer plates 124 and 126. The central bolt 130 can define an axis of rotation 132, and the folding mechanism 106 can rotate about the axis of rotation 132.

The middle plate 118 can also include an upper guide slot 134. The upper guide slot 134 can be arcuate in shape, and has a first end 136 and a second end 138. The upper guide slot 134 can be sized so that a upper guide bolt 140 can slide within the guide slot 134 from the first end 136 to the second end 138. Each of the outer plates 124 and 126 can have a upper guide bolt opening 142, and the upper guide bolt 140 can be inserted and connected through the guide bolt openings 142 and the upper guide slot 134. The length of the upper guide slot 134 can be selected to limit the rotation of the folding mechanism 106 is limited to a desired extent.

The middle plate can further include a lower guide slot 144. The lower guide slot 144 can be arcuate in shape, and has a first end terminating in a folded lock hole 146 and a second end terminating in an unfolded lock hole 148. Each of the outer plates 124 and 126 can have a lower opening 150, and a spring-loaded pin 152 can be inserted and connected through the lower opening 150 and the lower guide slot 144.

Figure 8:
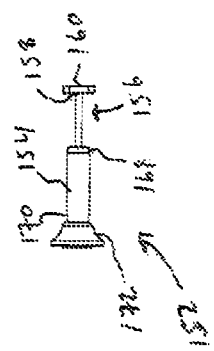
FIG. 8 illustrates the spring-loaded pin of FIG. 6 in an extended position.
Figure 7:
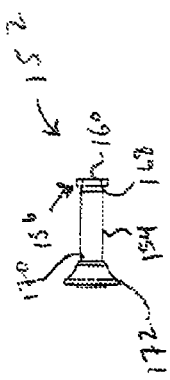
FIG. 7 illustrates the spring-loaded pin of FIG. 6 in a condensed position.
Figure 6:
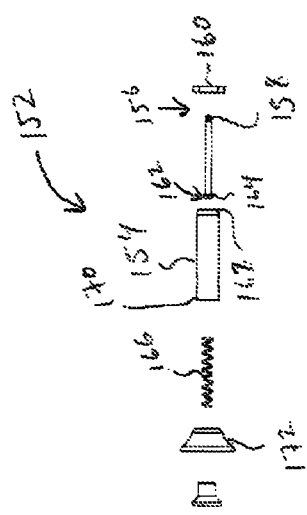
FIG. 6 illustrates an exploded view of one example of a spring-loaded pin of the locking mechanism of FIGS. 3-5.

As shown in FIGS. 6 through 8, the spring-loaded pin 152 can include a cylindrical housing 154, which can be a hollow cylinder having a passage defined therethrough, and a plunger 156 that is received within the passage of the cylindrical housing 154. The plunger 156 can include an outer end 158 that passes through the lower opening 150 of the first outer plate 124 and can be secured in place by a disk-shaped back 160. In the illustrated example, the outer end 158 can be threaded, and the disk shaped back 160 can screw onto the outer end 158. The plunger 156 can also include an inner end 162 that is positioned within the passage of the cylindrical housing 154 and can include a screw head 164. A compression coil spring 166 can be positioned within the passage of the cylindrical housing 154 between the inner end 162 of the plunger 156 and an annular internal lip 168 surrounding an opening on the inner end of the cylindrical housing 154. The outer end 170 of the cylindrical housing 154 can pass through the lower opening 150 of the second outer plate 126, and can include a knob 172. The plunger 156 can be sized to pass through the lower guide slot 144 of the middle plate 118. The cylindrical housing 154 can be sized to fit into the folded lock hole 146 and the unfolded lock hole 148 of the middle plate 118. In the illustrated example, the annular internal lip 168 of the cylindrical housing 154 has a reduced diameter as compared to the diameter of the remainder of the cylindrical housing 154, and the annular internal lip 168 can be sized to fit into the folded lock hole 146 and the unfolded lock hole 148 of the middle plate 118, while the remainder of the cylindrical housing 154 can have a diameter that is too large to allow the cylindrical housing 154 to pass through the lower guide slot 144.

In practice, when the folding scooter 100 is in the unfolded position, the spring-loaded pin 152 can be in a condensed position as illustrated in FIG. 7, and the cylindrical housing 154 can be positioned within the unfolded lock hole 148 of the middle plate 118. As a result, the scooter is locked in the unfolded position illustrated in FIG. 1.

To fold the handlebar shaft 110 of the folding scooter 100 toward the scooter deck 102 and place the folding scooter 100 in the folded position illustrated in FIG. 2, a user can exert manual force to pull outward on the knob 172 of the cylindrical housing 154, so that the cylindrical housing 154 is removed from the unfolded lock hole 148 and the spring-loaded pin 154 is in an extended position as illustrated in FIG. 8. The plunger 156 can then slide within the lower guide slot 144 of the middle plate 118 from the unfolded lock hole 148 to the folded lock hole 146 as the handlebar shaft 110 is rotated downwardly towards the deck 102. When the folding scooter 100 reaches the folded position, the compression coil spring 166 can cause the cylindrical housing 154 to automatically engage the folded lock hole 146 of the middle plate 118. The folding scooter 100 can thus be locked in the folded position.

From the foregoing, it will be appreciated that although specific examples have been described herein for purposes of illustration, various modifications may be made without deviating from the spirit or scope of this disclosure. It is therefore intended that the foregoing detailed description be regarded as illustrative rather than limiting, and that it be understood that it is the following claims, including all equivalents, that are intended to particularly point out and distinctly claim the claimed subject matter.

What is claimed is:

1. A folding scooter comprising:
    a deck;
    a front frame member pivotally connected to the deck, the front frame member having a leading end and a trailing end, the trailing end of the front frame member having a first outer plate and a second outer plate;
    a middle plate connected to and extending from a front end of the deck, the middle plate being received between the first outer plate and the second outer plate;
    a central opening provided in the middle plate, the first outer plate, and the second outer plate;
    a central bolt passing through the central openings in the middle plate, the first outer plate and the second outer plate to connect the middle plate and the first and second outer plates;
    a first guide slot, in the middle plate, having a first end terminating in a folded lock hole and a second end terminating in an unfolded lock hole;
    a first guide opening in the first outer plate and the second outer plate;
    a spring-loaded pin being inserted through the first guide opening in the first outer plate, the first guide slot in the middle plate, and the first guide opening in the second outer plate, a first portion of the spring-loaded pin having a diameter sized to pass through the first guide slot as the spring-loaded pin moves between the first and second lock holes, a second portion of the spring-loaded pin having a diameter larger than the width of the first guide slot and sized to fit within the first lock hole to lock the front frame member in a first position and to fit within the second lock hole to lock the front frame member in a second position;
    a second guide slot in the middle plate, the central opening being positioned between the first guide slot and the second guide slot;
    a second guide opening in the first outer plate and the second outer plate;
    a guide bolt being inserted through the second guide opening in the first outer plate, the second guide slot in the middle plate, and the second guide opening in the second outer plate;
    a head tube connected to a front end of the front frame member;
    a front wheel connected to the head tube; and
    a back wheel connected to the deck.

2. The folding scooter of claim 1, further comprising a handlebar shaft connected to the head tube, wherein the folding scooter has an unfolded position in which the handlebar shaft extends upwards and is substantially perpendicular to the deck, and a folded position in which the handlebar shaft rests substantially parallel to the deck.

3. The folding scooter of claim 1, wherein the spring-loaded pin comprises a cylindrical housing having a passage defined therethrough, and a plunger that is received within the passage of the cylindrical housing.

4. The folding scooter of claim 3, wherein the plunger comprises an outer end that passes through the first guide opening of the first outer plate, and a disk-shaped back.

5. The folding scooter of claim 3, wherein the plunger comprises a shaft that is configured to pass through any of the first guide slot, the folded lock hole and the unfolded lock hole.

6. The folding scooter of claim 3, wherein the cylindrical housing is configured to not be able to pass through the first guide slot, but does fit into each of the folded lock hole and the unfolded lock hole.

7. The folding scooter of claim 3, wherein a portion of the cylindrical housing is configured to fit into each of the folded lock hole and the unfolded lock hole, and another portion of the cylindrical housing is configured to not fit into each of the folded lock hole and the unfolded lock hole.

8. The folding scooter of claim 3, further comprising a compression coil spring configured to cause the cylindrical housing to automatically engage one of the folded lock hole and the unfolded lock hole.

9. A folding scooter comprising:
a deck;
a front frame member having a leading end and a trailing end, the front frame member being pivotally connected to the deck by a folding mechanism having a spring-loaded pin, the folding mechanism having a first guide slot, a second guide slot opposing the first guide slot, and a central opening between the first and second guide slots;
the first guide slot being configured between first and second lock holes, the first and second lock holes having a diameter larger than the width of the first guide slot,
a first portion of the spring-loaded pin having a diameter sized to pass through the first guide slot as the spring-loaded pin moves between the first and second lock holes, a second portion of the spring-loaded pin having a diameter larger than the width of the first guide slot and sized to fit within the first lock hole to lock the folding mechanism in a first position and to fit within the second lock hole to lock the folding mechanism in a second position;
a central bolt passing through the central opening;
a guide bolt passing through and positioned moveable within the second guide slot;
a head tube connected to a front end of the front frame member;
a handlebar shaft connected to the head tube;
a front wheel connected to the head tube; and
a back wheel connected to the deck.

10. The folding scooter of claim 9, wherein the folding scooter has an unfolded position in which the handlebar shaft extends upwards and is substantially perpendicular to the deck, and a folded position in which the handlebar shaft rests substantially parallel to the deck.

11. The folding scooter of claim 9, further comprising:
a middle plate connected to and extending from a front end of the deck;
wherein the trailing end of the front frame member comprises a first outer plate and a second outer plate, and the middle plate is received between the first outer plate and the second outer plate.

12. The folding scooter of claim 11, wherein the middle plate, the first outer plate, and the second outer plate each include a central axis opening, wherein the central axis openings align when the middle plate is received between the outer plates, and a central bolt passes through the aligned central axis openings to connect the middle plate and the outer plates.

13. The folding scooter of claim 12, wherein the middle plate includes the second guide slot, the outer plates each include a second guide opening, and the guide bolt is inserted and connected through the second guide bolt openings and the second guide slot.

14. The folding scooter of claim 12, wherein the middle plate includes the first guide slot having the folded lock hole and the unfolded lock hole, each of the outer plates having a first guide opening, the spring-loaded pin being inserted and connected through the first guide openings and the first guide slot.

* * * * *